US008406520B2

(12) United States Patent
Henkel

(10) Patent No.: US 8,406,520 B2
(45) Date of Patent: Mar. 26, 2013

(54) X-RAY INSPECTION SYSTEMS WITH ENHANCED BRIGHTNESS CONTROL

(75) Inventor: Rainer Henkel, Schweppenhausen (DE)

(73) Assignee: Smiths Heimann GmbH, Wiesbaden (DE)

( * ) Notice: Subject to any disclaimer, the term of this patent is extended or adjusted under 35 U.S.C. 154(b) by 1038 days.

(21) Appl. No.: 11/870,413

(22) Filed: Oct. 10, 2007

(65) Prior Publication Data

US 2008/0089479 A1  Apr. 17, 2008

(30) Foreign Application Priority Data

Oct. 10, 2006  (DE) .......................... 10 2006 047 888

(51) Int. Cl.
*G06K 9/34* (2006.01)
*G01N 23/04* (2006.01)

(52) U.S. Cl. ......................................... 382/173; 378/57

(58) Field of Classification Search .................. None
See application file for complete search history.

(56) References Cited

U.S. PATENT DOCUMENTS

| | | | | |
|---|---|---|---|---|
| 4,009,393 A | * | 2/1977 | Ashley et al. ............ | 250/339.05 |
| 5,181,234 A | * | 1/1993 | Smith ............................. | 378/87 |
| 5,405,015 A | | 4/1995 | Bhatia et al. | |
| 5,692,029 A | * | 11/1997 | Husseiny et al. ................ | 378/88 |
| 5,715,334 A | * | 2/1998 | Peters ............................ | 382/254 |
| 5,974,111 A | * | 10/1999 | Krug et al. ....................... | 378/57 |
| 5,978,443 A | | 11/1999 | Patel | |
| 6,011,528 A | | 1/2000 | Inbar et al. | |
| 7,130,486 B2 | | 10/2006 | Eggers et al. | |
| 7,826,589 B2 | * | 11/2010 | Kotowski et al. ................ | 378/57 |
| 2008/0089479 A1 | * | 4/2008 | Henkel ............................ | 378/57 |

FOREIGN PATENT DOCUMENTS

DE  102 03 421 C1  4/2003

OTHER PUBLICATIONS

"Definition of Any", Online Free Merriam-Webster Dictionary, Date Accessed Jul. 13, 2012, Available online at: http://www.merriam-webster.com/dictionary/any.*
Peter Hertrich, "Practical Radiography Principles and Applications", Publisher: Siemens AG, Berlin, Munich., Publicis Corporate Publishing, 2004, pp. 235-284.

* cited by examiner

*Primary Examiner* — Bhavesh Mehta
*Assistant Examiner* — Tahmina Ansari
(74) *Attorney, Agent, or Firm* — Muncy, Geissler, Olds & Lowe, PLLC

(57) ABSTRACT

A method for improving detail detectability in x-ray images is provided, whereby by means of an x-ray inspection device a positive x-ray image of an object is made, the x-ray image is subdivided into an object region and an empty region, and the empty region of the x-ray image is darkened.

19 Claims, 2 Drawing Sheets

X-RAY INSPECTION SYSTEMS WITH ENHANCED BRIGHTNESS CONTROL

This nonprovisional application claims priority under 35 U.S.C. §119(a) to German Patent Application No. DE 102006047888, which was filed in Germany on Oct. 10, 2006, and which is herein incorporated by reference.

BACKGROUND OF THE INVENTION

1. Field of the Invention

The present invention relates to a method for improving detail detectability in x-ray images and to an x-ray system for performing the method.

2. Description of the Background Art

X-ray inspection systems are often employed, for example, at airports for security checking of objects such as, for example, pieces of luggage, for dangerous content. X-ray inspection devices of this type typically generate a positive image; in this case, an image point is the brighter, the less the x-ray beam is attenuated or absorbed at this point of the object during transmission. The thus generated positive x-ray image is displayed on a display device, for example, a monitor, optionally after image processing, for example, for color accentuation of certain areas. It turned out that with a high dynamic range of the shown x-ray image the operator can recognize details only poorly because of glare effects. Reducing the dynamic range of the image brightness, however, results in information loss and thereby in a poorer detection result.

SUMMARY OF THE INVENTION

It is therefore an object of the present invention to provide a method and a device for improving detail detectability in x-ray images with no loss of information.

It was found within the scope of the invention that blinding of the operating personnel of the x-ray inspection system by bright image areas results in poorer detail detectability. This is prevented according to the invention in that areas of the x-ray image that are not taken up by the object to be examined and are typically very bright are darkened.

First, a positive x-ray image of an object is made using an x-ray inspection system, the x-ray image is divided into an object region and an empty region, and the empty region of the x-ray image is darkened. The object region is the region of the x-ray image in which the object to be examined is located. The empty region is the rest of the x-ray image. The object region or the empty region need not be a single, connected region in each case.

The darkening of the empty region occurs, for example, by replacement of the image information in the empty region by a uniform color, preferably gray with a brightness of, for example, 0%, 20%, 50%, or 75%, whereby a brightness of 0% corresponds to black and a brightness of 100% to white.

Alternatively, to darken the empty region, the brightness of each image point in this region is multiplied by a factor of, for example, 0.2, 0.5, or 0.75. In another alternative, the empty region is darkened by reducing the brightness value of the image points in the empty region by a specific value. If this difference produces a brightness value that is lower than the minimal possible brightness value, the result is replaced by the minimal brightness value. The first alternative has the advantage that a simple replacement of the empty region by a set color or brightness merely requires little computational effort. The second and third alternatives have the advantage that image information is retained in the empty region as well.

Furthermore, alternatively the darkening of the empty region occurs with the use of a lookup table. This means that a specific brightness value in the empty region is assigned another brightness value according to a transformation table. This has the advantage that lookup tables enable rapid calculation of the darkening of the empty region and different darkening degrees can be assigned to different brightness value regions. Moreover, the operator can be provided with different darkening modes by means of different lookup tables.

The darkening of the empty region can preferably be turned on by the viewer of the x-ray image. As a result, it is possible for the viewer to switch between the conventional display of the x-ray image and the display modified according to the invention. Alternatively, the darkening occurs automatically, for example, depending on the brightness of the empty region, the ratio of the brightness of the empty region and the object region, or as established in the x-ray inspection system configuration. The average brightness of the region or the maximum and/or minimal brightness of the region are considered as the brightness. The x-ray inspection system configuration contains, for example, the specification whether the darkening is essentially turned on or off.

The degree of darkening is variable in an embodiment of the invention. This means that with uniform filling of the empty region the color or brightness can be set, in the case of multiplication of the brightness the darkening factor, or in the case of determination of the brightness of the empty region by calculating the difference the value of the subtrahends. This setting occurs automatically, for example, with use of the average brightness of the x-ray image or of the object region. Alternatively, the degree of darkening can be set by the user.

Preferably, the object region and/or the empty region of the x-ray image can be determined by image processing. In the empty region of the x-ray image, the x-radiation is only slightly attenuated by the air and a possible transport direction. In contrast, the object to be examined, which causes further attenuation of the transmitted x-radiation, is present in the object region. The object contour can be determined from the different transmission degree and the thereby associated different brightness of the x-ray image, and the x-ray image can therefore be divided into an object region and empty region.

Alternatively or in addition, the object region or the empty region of the x-ray image can be determined by sensors such as, for example, photoelectric sensors or distance sensors. The position of the object to be examined in the x-ray inspection device is determined by means of these sensors. This position corresponds to the position of the object region in the x-ray image.

In an embodiment of the invention, the subdivision of the x-ray image into an object region and empty region occurs approximatively, for example, by rectangles. This means that the object region in the x-ray image is formed by one or more rectangles, which recreate approximately the contour of the object. This results in a simpler darkening of the empty region of the x-ray image, because the empty region in the approximation of the object, for example, by rectangles is limited by straight edges.

The contour of the object can thus be detected precisely and reproduced in the x-ray image. This has the result that the empty region fits precisely against the object and thereby a darkening occurs in a largest possible region of the x-ray image.

Optionally, a clearance distance is provided between the actual contour of the object and the separation between the object region and empty region in the x-ray image. This means that a border preset by the clearance distance around the determined contour of the object to be examined is assigned to the object region of the x-ray image. Thus, a corona or halo results around the object. The result is that no region of the object is darkened also in the case of non-optimal detection of the object contour.

An x-ray inspection system to carry out the method has an x-ray inspection device, a display device, and means for determining and darkening an empty region of the x-ray image. In this case, the x-ray inspection device creates the positive x-ray image of the object to be examined. The means for darkening the empty region performs the darkening as previously described. The display device serves to display the original and darkened x-ray image.

In an embodiment, the x-ray inspection system has an actuating element for performing the darkening of the empty region. Preferably, when the actuating element is not actuated, the original x-ray image is displayed and when the actuating element is actuated, the x-ray image darkened in the empty region.

An x-ray inspection system of the invention optionally has an actuating element to influence the degree of darkening of the empty region. Thereby, the user of the x-ray inspection system as previously described can influence the darkening in such a way that optimal detail detectability is achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
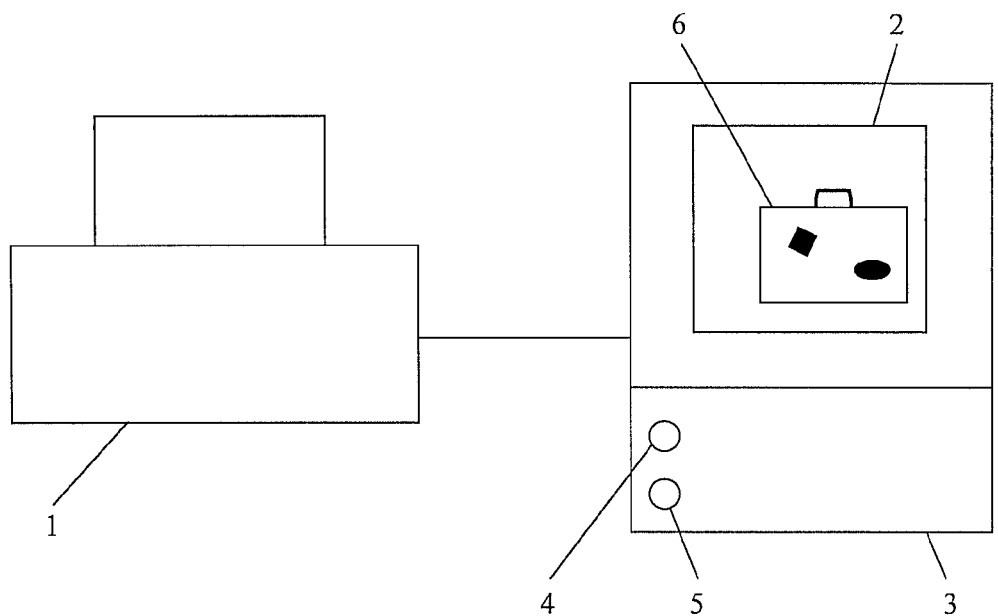
FIG. 1 illustrates an x-ray inspection system.

FIG. 1 shows schematically an x-ray inspection system with an x-ray inspection device 1, a monitor 2, and an operator console 3. In the present exemplary embodiment, the x-ray inspection system is used for the security checking of objects, for example, at an airport or in access control to a building.

A suitcase 6 is located in x-ray inspection device 1, in which it is exposed to x-radiation and the strength of the transmitted x-radiation is detected. The x-ray inspection system calculates the image of suitcase 6 as depicted on screen 2 from the intensity of the transmitted radiation. This is a positive image in which the highly absorbing regions are shown dark and the absorbing regions light.

Figure 2:
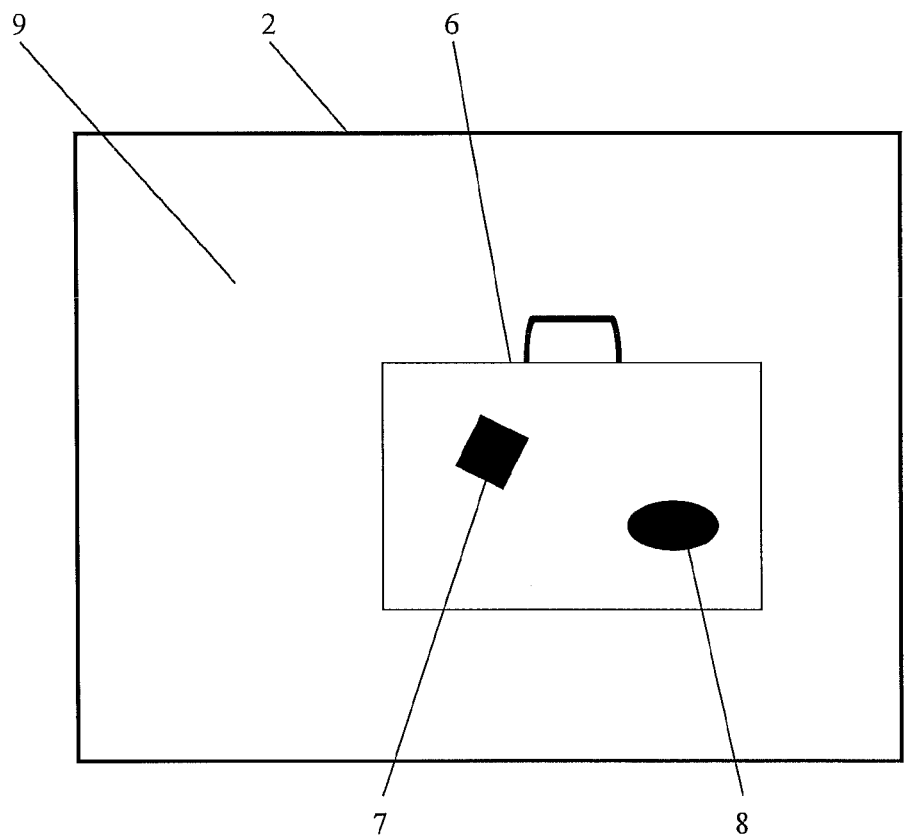
FIG. 2 illustrates an original x-ray image.

FIG. 2 shows an enlarged image of the x-ray image rendered on screen 2. Empty region 9 is the region of the x-ray image, which is not taken up by the object to be examined. In this region, the radiation penetrates air primarily and depending on the design of x-ray inspection device 1, for example, a conveyor belt or feed rollers. In the region, taken up by suitcase 6, of the x-ray image, the radiation penetrates in addition suitcase 6, which is why in this so-called object region 10 the intensity of the transmitted radiation is lower than in empty region 9. From this difference, the image processing running in the x-ray inspection system calculates the contour of suitcase 6 and thereby the boundary between empty region 9 and object region 10 taken up by suitcase 6.

In a next process step, empty region 9 of the x-ray image is darkened. In the present exemplary embodiment, this occurs by multiplying the brightness value of each image point in empty region 9 by a darkening factor of 0.25. The modified x-ray image shown in FIG. 3 results. Suitcase 6 and objects 7 and 8 arranged therein appear more clearly in the x-ray image by the darkening of empty region 9. In particular, blinding of the operating personnel of the x-ray inspection system is reduced, because only a reduced total brightness is now radiated from screen 2.

Figure 3:
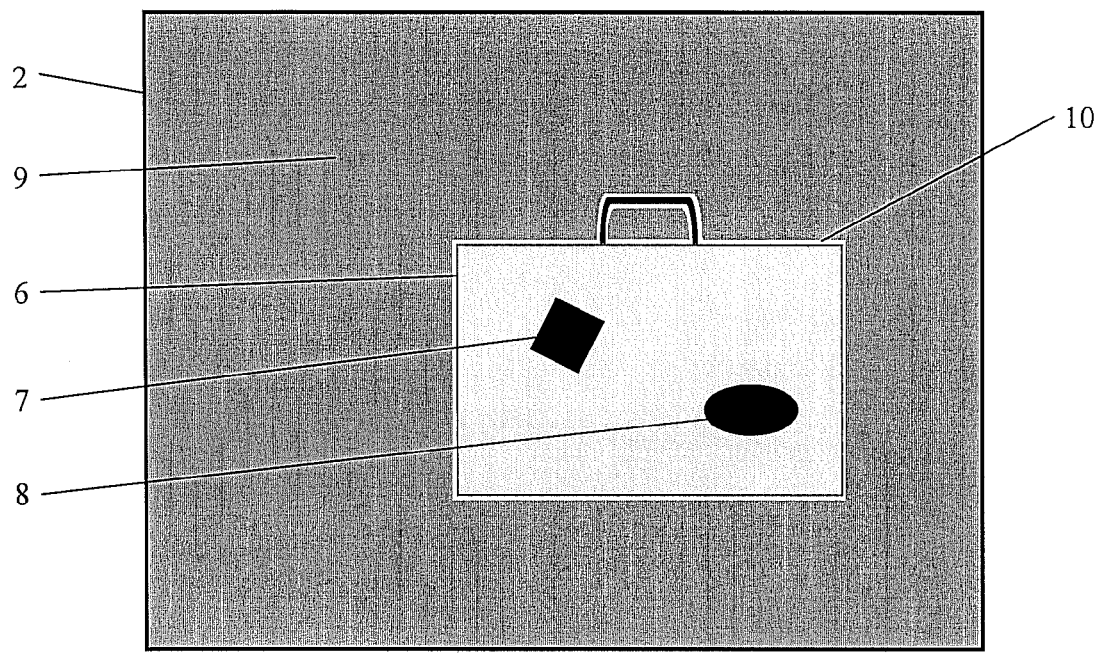
FIG. 3 illustrates the x-ray image of FIG. 2 with a darkened empty region.

In the modified x-ray image shown in FIG. 3, object region 10 is slightly larger than the contour of suitcase 6. This assures that regions of the x-ray image, in which the object is located, are not accidentally assigned to empty region 9.

The operator switches between the images in FIG. 2 and FIG. 3 by means of actuating element 4 disposed on operator console 3 in the form of a button. The operator can influence the darkening factor and thereby the intensity of the darkening of empty region 9 by means of optional control knob 5.

Figure 4:
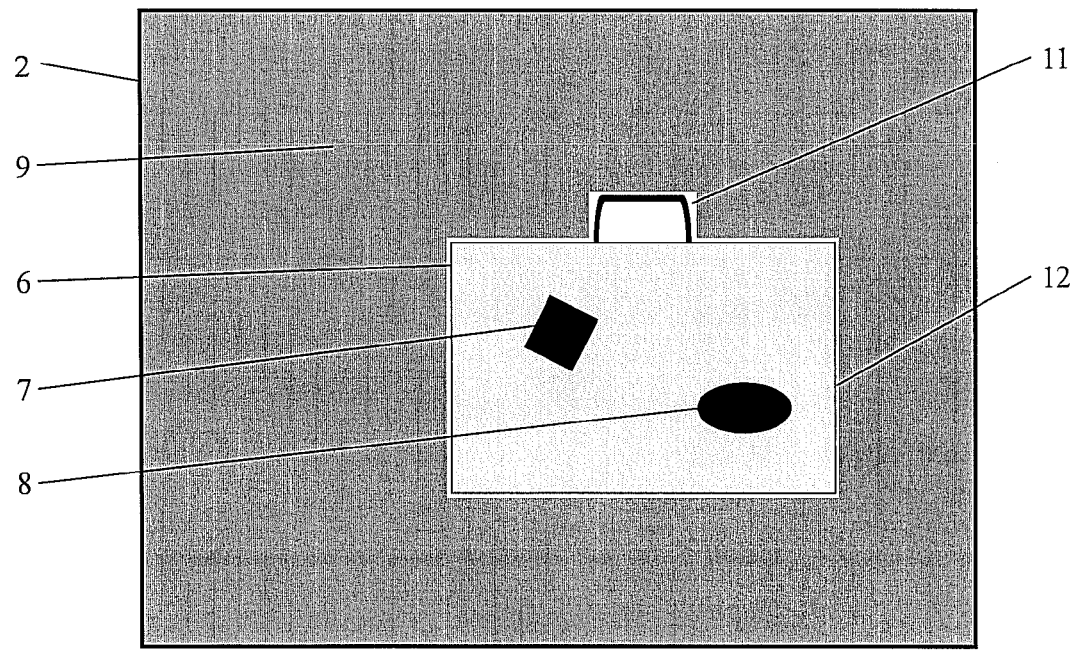
FIG. 4 illustrates the x-ray image of FIG. 2 with an approximated object region.

FIG. 4 shows the x-ray image from FIG. 2, whereby the object region is approximated by two rectangles 11 and 12. Rectangle 11 reproduces the main portion of suitcase 6 and rectangle 12 the handle.

The present exemplary embodiment is simply an example and not to be taken as limiting. Instead of suitcase 6, any object can be analyzed by means of the x-ray inspection system. The contour of the object to be examined can be determined apart from image processing also, for example, by sensors such as photoelectric sensors or distance sensors. In addition to the multiplication of the brightness values of the image points in the empty region, replacement by a constant brightness value or the subtraction of a brightness value is possible. The clearance distance, shown in FIG. 3, between the actual contour of the object and the separation between the object region and empty region is optional, so that in an alternative embodiment this separation coincides with the determined contour of the object.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for enhancing detail detectability in x-ray images, the method comprising:

providing, via an x-ray inspection device, a positive x-ray image of a suitcase or other container under examination for one or more items of interest therein, the positive x-ray image having a brightness that is inversely related to x-ray beam attenuation;

subdividing the x-ray image into an object region and an empty region, the object region including the suitcase or other container under examination and the items of interest therein, and the empty region excluding the suitcase or other container under examination and the items of interest therein; and darkening the empty region of the x-ray image relative to the object region.

2. The method according to claim 1, wherein the darkening of the empty region is turned on by a viewer of the x-ray image.

3. The method according to claim 1, wherein the darkening of the empty region occurs automatically.

4. The method according to claim 1, wherein the degree of darkening is variable.

5. The method according to claim 1, wherein at least one of the object region or the empty region of the x-ray image is determined via image processing.

6. The method according to claim 1, wherein at least one of the object region or the empty region of the x-ray image is determined by sensors, photoelectric sensors or distance sensors.

7. The method according to claim 1, wherein the object region and the empty region are approximated by rectangles.

8. The method according to claim 1, wherein a contour of the suitcase or other container is detected precisely and reproduced.

9. The method according to claim 8, wherein a clearance distance is provided between the determined contour of the suitcase or other container and a separation between the object region and empty region in the x ray image.

10. An x-ray inspection system comprising:
an x-ray inspection device;
a display device for displaying a positive x-ray image of a suitcase or other container under examination for one or more items of interest therein, the positive x-ray image having a brightness that is inversely related to x-ray beam attenuation, wherein the x-ray image is subdivided into an object region and an empty region, the object region including the suitcase or other container under examination and the items of interest therein, and the empty region excluding the suitcase or other container under examination and the items of interest therein; and
a device for determining and darkening the empty region of the x-ray image relative to the object region.

11. The inspection system according to claim 10, further comprising an actuating element for darkening of the empty region.

12. The x-ray inspection system according to claim 10, further comprising an actuating element for influencing a degree of darkening of the empty region.

13. The method according to claim 1, wherein the darkening of the empty region is adjustable via image processing software.

14. A non-transitory computer-readable medium comprising code, which, when executed by a machine, causes the machine to perform operations for enhancing detail detectability in x-ray images, the computer-readable medium comprising:
code for analyzing a positive x-ray image of a suitcase or other container under examination from an x-ray inspection device for one or more items of interest therein, the positive x-ray image having a brightness that is inversely related to x-ray beam attenuation;
code for subdividing the x-ray image into an object region and an empty region, the object region including the suitcase or other container under examination and the items of interest therein, and the empty region excluding the suitcase or other container under examination and the items of interest therein; and
code for darkening the empty region of the x-ray image relative to the object region.

15. The method according to claim 1, wherein the other container includes one or more pieces of luggage.

16. The method according to claim 1, wherein the one or more items of interest correspond to dangerous contraband contained in the suitcase or other container.

17. The method according to claim 1, wherein darkening the empty region of the x-ray image relative to the object region comprises darkening the empty region while maintaining a brightness of the object region.

18. The method according to claim 1, wherein the empty region of the x-ray image is darkened according to a darkening factor.

19. The method according to claim 1, wherein the empty region of the x-ray image is darkened by replacing image information in the empty region with a uniform color.

* * * * *